A. J. HALL.
CONTROL APPARATUS.
APPLICATION FILED DEC. 2, 1916.

1,374,562.

Patented Apr. 12, 1921.
6 SHEETS—SHEET 3.

WITNESSES:
R. J. Fitzgerald
W. R. Coley

INVENTOR
Arthur J. Hall.
BY
Wesley G. Carr
ATTORNEY

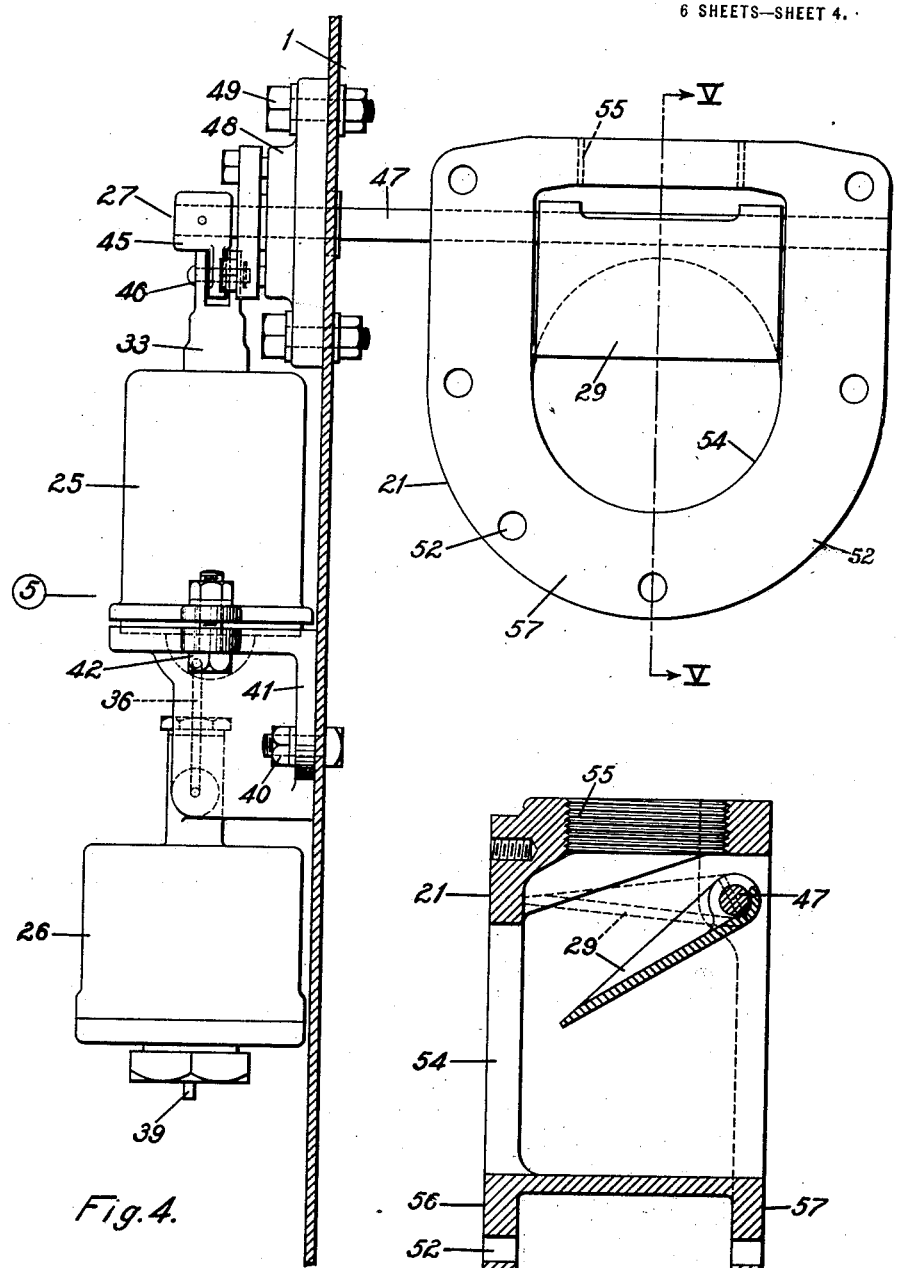

A. J. HALL.
CONTROL APPARATUS.
APPLICATION FILED DEC. 2, 1916.

1,374,562.

Patented Apr. 12, 1921.
6 SHEETS—SHEET 5.

WITNESSES:
R.J. Fitzgerald
W.R. Coley

INVENTOR
Arthur J. Hall.
BY
Wesley G. Carr
ATTORNEY

A. J. HALL.
CONTROL APPARATUS.
APPLICATION FILED DEC. 2, 1916.
1,374,562.
Patented Apr. 12, 1921.
6 SHEETS—SHEET 6.
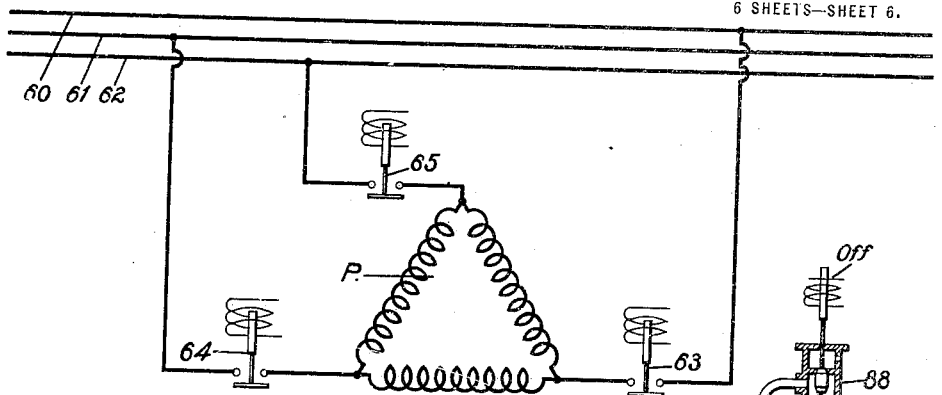
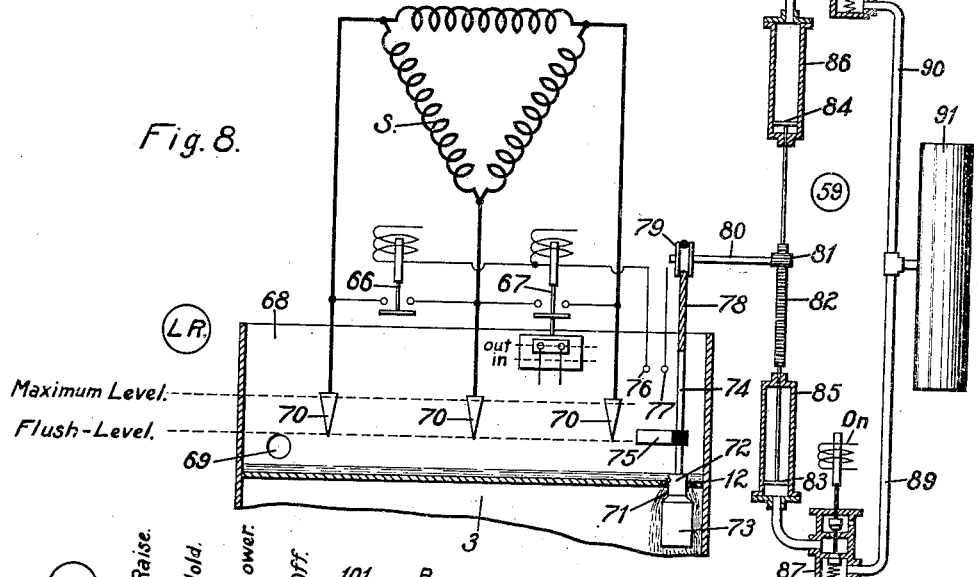
WITNESSES:
R. J. Fitzgerald
W. R. Coley
INVENTOR
Arthur J. Hall.
BY
Wesley G. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,374,562.   Specification of Letters Patent.   Patented Apr. 12, 1921.

Application filed December 2, 1916. Serial No. 134,610.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Apparatus, of which the following is a specification.

My invention relates to control apparatus for electric motors and especially to a combination of an electrode-containing tank and a cooling tower in apparatus of the liquid-rheostat type.

The object of my invention is to provide means for circulating a portion of the main body of electrolyte through the cooling tower, for the purpose of effecting a certain reduction in the temperature of the liquid, only when the rheostat is not actively connected in circuit.

More specifically stated, it is the object of my invention to provide a liquid rheostat comprising an adjacently-located electrode-containing tank and cooling tower, suitable pipes for conducting fluid to the respective receptacles, a valve for closing or regulating the entrance to the pipe that communicates with the cooling tower, and a master controller for governing the operation of said valve, in conjunction with its other functions, in such manner that a maximum volume of electrolyte is circulated through the tank whenever the rheostat is actively connected in circuit, while a certain portion of the liquid is diverted through the cooling tower at other times for the above-mentioned purpose, as hereinafter more fully set forth.

The system just described thus allows the use of the entire volume of liquid during active rheostatic operation, and the diversion of liquid through the cooling tower during other periods is sufficient to produce a desirable reduction of liquid temperature. Furthermore, such diversion of liquid at the time the tank is being emptied into a discharge reservoir aids in the rapid discharge of the liquid from the tank.

Figure 1:
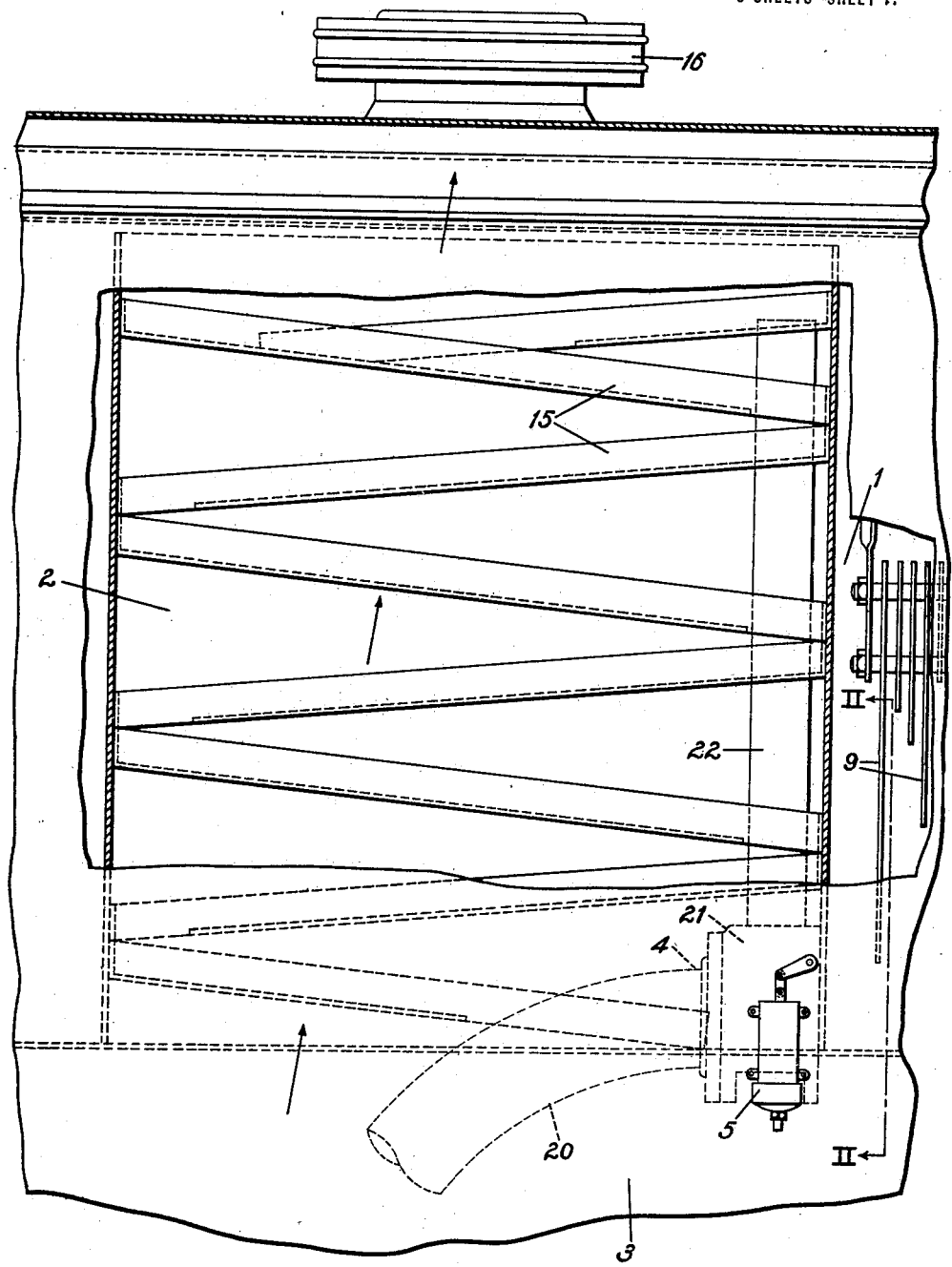
Figure 2:
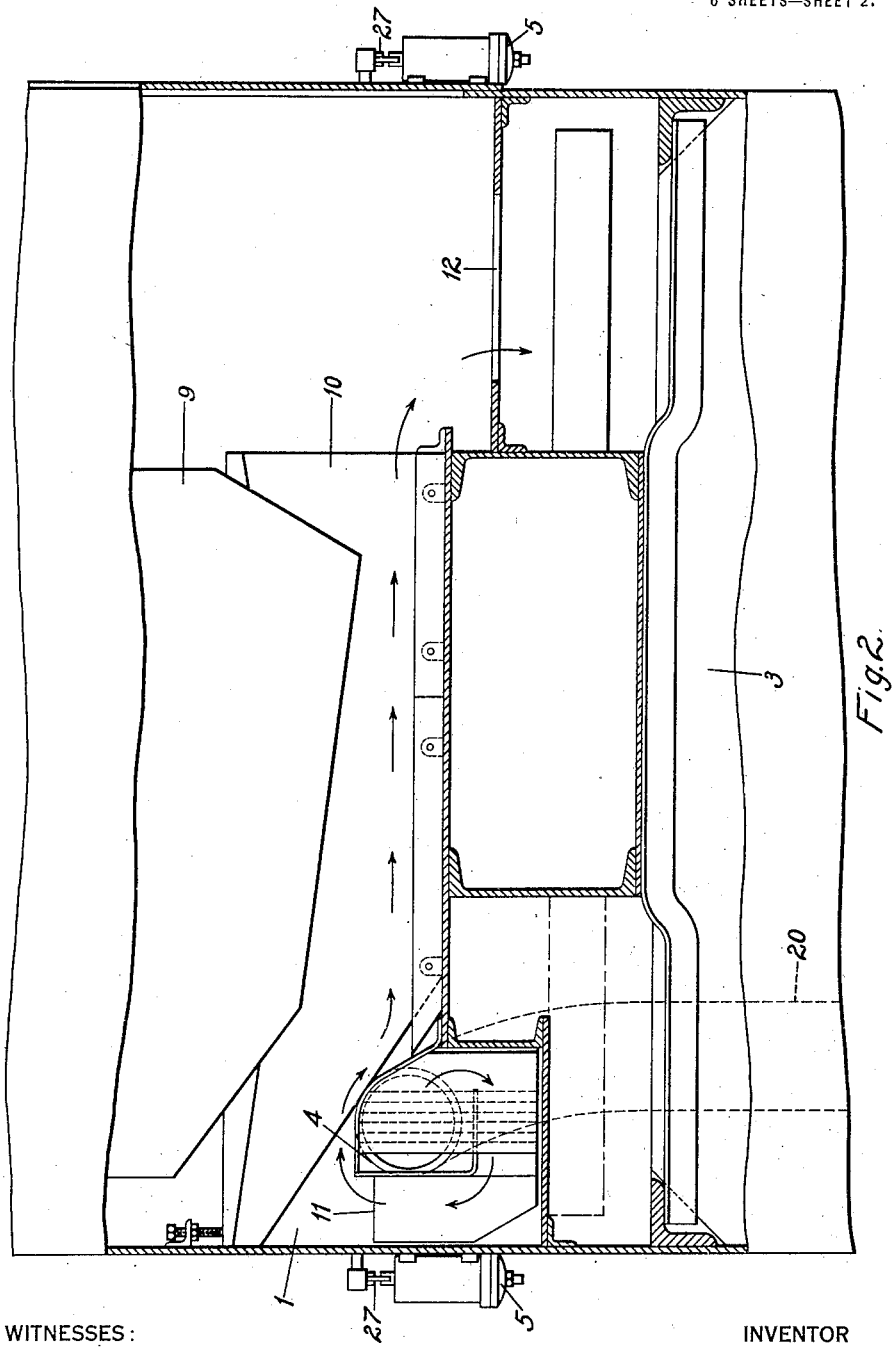
Figure 3:
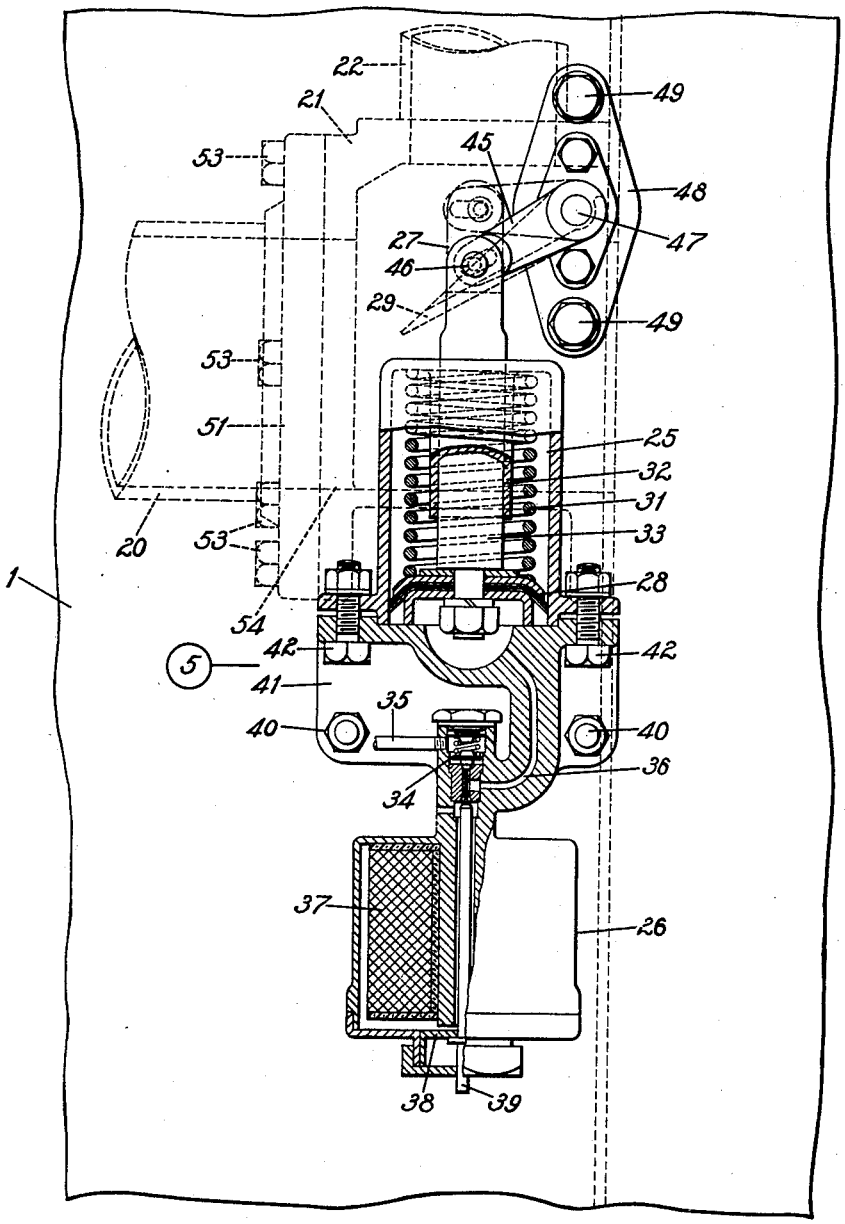
Figure 6:
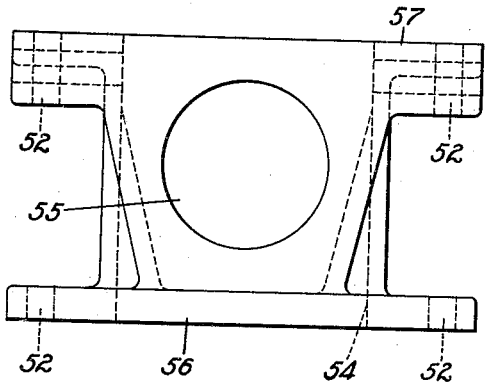
Figure 7:
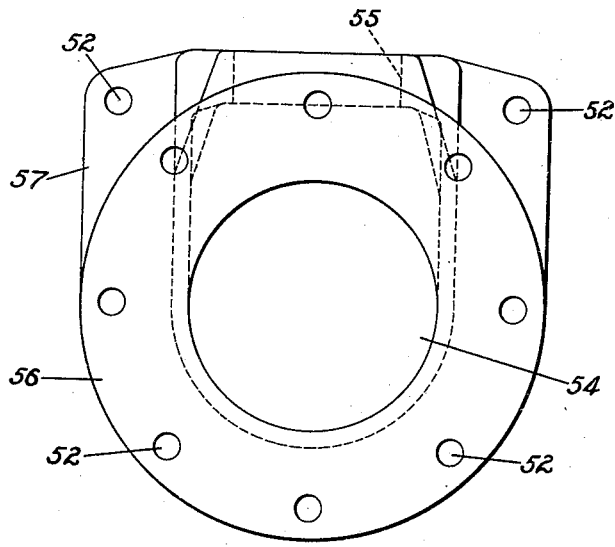

My invention may best be understood by reference to the accompanying drawings, wherein Figure 1 is a fragmentary view in front elevation, with parts broken away for clearness, of a liquid rheostat constructed in accordance with my invention; Fig. 2 is a sectional view taken on the line II—II of Fig. 1; Fig. 3 is an enlarged view, with parts broken away for clearness, of a portion of the apparatus shown in Fig. 1; Fig. 4 is a side elevational view of the apparatus shown in Fig. 3; Fig. 5 is a sectional view taken on the line V—V of Fig. 4; Fig. 6 and Fig. 7 are views in plan and in front elevation, respectively, of a part of the structure shown in Fig. 4; Fig. 8 is a diagrammatic view of the main circuits of a control system utilizing my present invention; and Fig. 9 is a diagrammatic view of the auxiliary governing circuits for the system shown in Fig. 8.

Referring to Fig. 1 and to Fig. 2 of the drawing, the apparatus shown comprises, in general, an electrode-containing tank 1, an adjacently-located cooling tower 2 and a common discharge reservoir 3 that is disposed below the other portions of the liquid rhetostat, together with liquid-conducting means 4 for the tank 1 and the tower 2, and my electrically-controlled pneumatically-operated mechanism 5 for varying the distribution of liquid to the two receptacles.

The tank 1 is provided with a plurality of suitably mounted plates or electrodes 9; a plurality of flow-directing insulating barrier members 10 that extend upwardly from the tank bottom between the electrodes; a liquid-admitting device or inlet weir 11 that extends across the entire width of the tank and one end of which is in communication with the liquid-conducting means 4; and one or more discharge openings 12 from the tank into the bottom reservoir which are provided with suitable sliding hollow valve members, as indicated in Fig. 8, for the purpose of varying the liquid level in the tank.

Inasmuch as my present invention relates to the automatic distribution of liquid between the tank and the cooling tower, the other portions of the liquid rheostat will be described as briefly as is consistent with a thorough comprehension of the invention. For more detailed descriptions of such parts, reference may be had to a copending application of A. J. Hall and C. C. Whittaker, Serial No. 136,033, filed Dec. 9, 1916, and to another co-pending application of C. C. Whittaker, Serial No. 134,762, filed Dec. 2, 1916, both applications being assigned to the Westinghouse Electric & Manufacturing Company.

In general, electrolyte is admitted to one end of the inlet weir 11 from the liquid-conducting means 4 and then drops through a bottom opening of the weir, whence it follows a spiral path of entrance into the rheostat tank 1, as indicated by the arrows in Fig. 2. The liquid flows parallel to the electrodes 9 and is discharged through the opening or openings 12 around the valve or valves that are associated therewith, a continuous circulation of electrolyte being maintained through the agency of any suitable pumping means (not shown).

The cooling tower 2 may be of any appropriate construction and is shown as comprising a series of inclined trays 15 for conducting a predetermined portion of the electrolyte, as determined by the liquid-admitting means 4 and the associated mechanism 5, over the successive trays and thence back into the discharge reservoir 3. A suitable air current is meanwhile forced upwardly through the cooling tower from an appropriate blower (not shown) and, after coming into intimate contact with the electrolyte, the air current passes out through a suitable top ventilating opening 16, as indicated by the arrows.

The liquid-admitting means 4 comprises a main inlet pipe 20 that leads from the above-mentioned pumping means into a three-way connection or junction-box 21, from which a branch pipe 22 extends upwardly along the one side of the cooling tower 2 to the uppermost tray 15, while an opening opposite the main inlet pipe 20 communicates with one end of the inlet weir 11, as shown in Fig. 2.

The mechanism 5 for varying the distribution of liquid between the tank and the cooling tower is clearly shown in Fig. 3 and Fig. 4 and comprises, in general, an air cylinder 25, an electro-magnet 26 for governing the admission of fluid pressure to the cylinder, and a linkage mechanism 27 for transmitting the movement of a piston 28 that travels within the cylinder 25 to a valve member 29, of the butterfly or damper type, which serves to open or close the entrance to the branch pipe 22 leading into the cooling tower 2.

The air-cylinder apparatus 25 is of a familiar type wherein the upward movement of the piston 28, by reason of the admission of fluid pressure to the cylinder, is opposed by a helical spring 31, while an annular stop member 32 within the cylinder determines the upper limit of travel of the piston. The piston rod or stem 33 extends upwardly through the cylinder 25 and is suitably connected to the linkage mechanism 27, in a manner to be set forth.

The electro-magnet 26 comprises a valve member 34, of a familiar spring-biased type, for normally preventing the access of fluid pressure from a pipe 35, that communicates with any suitable source of fluid pressure (not shown), to a passage 36 which leads into the air cylinder 25. An actuating coil 37 is adapted, when energized, to attract an armature or magnetic keeper 38 to which the actuating rod 39 for the valve member 34 is secured, whereby compressed air, or other suitable operating medium, is admitted beneath the piston 28.

The valve-controlling mechanism 5 may be positioned, as a whole, upon the outer wall of the tank 1 by means of a plurality of bolts 40 that extend through a suitable base member 41, while the operating cylinder 25 may be attached to a flange of the base member 41 through the agency of suitable bolts 42.

The linkage mechanism 27 comprises a bar or link 45, one end of which is pivotally secured, through a suitable pin-and-slot connection 46 to the upper end of the piston rod 33, while the other end of the link 45 is rigidly secured to a shaft 47 that extends into the tank 1 and carries the butterfly valve member 29. The outer portion of the shaft 47 is mounted in a suitable bearing member 48 that is secured to the tank wall by means of bolts 49.

The three-way connection or junction-box 21 is provided, on the side that corresponds to the main inlet pipe 20, with a cover or lid 51 having a plurality of holes 52 through which relatively long bolts 53 extend to properly position the junction-box upon the adjacent cooling-tower wall. A vertically-located inlet opening 54 communicates with the main-inlet pipe 20, while a horizontally-disposed opening 55 leads into the branch pipe 22. As most clearly shown in Fig. 6, the junction-box 21 is provided with a main or front flange member 56 which, in conjunction with the cover 51, incloses the inlet end of the pipe 20, and with a rear flange member 57, which houses the shaft 47, the boltholes 52 extending through both flanges.

The mechanical operation of the valve-controlling mechanism 5 may be set forth as follows: In the illustrated normal position of the butterfly valve member 29, the incoming stream of liquid from the main inlet pipe 20 divides, the main portion passing into the inlet weir 11, while a predetermined minor portion flows upwardly through the branch pipe 22 into the uppermost tray 15 of the cooling tower. Upon energization of the actuating coil 37, fluid pressure is admitted to the cylinder 25, whereby the piston 28 is actuated upwardly to effect a predetermined rotative movement of the shaft 47 and the mechanically associated valve member 29 to entirely close the entrance 55 to the branch pipe 22, as shown in dotted lines in Fig. 5. Upon deënergization of the actuating coil 37, the helical spring 31 forces the piston 28 downwardly to the illustrated position to again effect a diversion of a portion of the incoming liquid into the cooling tower 2.

Reference may now be had to Fig. 8, wherein the system shown comprises a plurality of three-phase supply-circuit conductors 60, 61 and 62; an induction motor having a primary winding P and a wound-rotor secondary winding S; a liquid rheostat LR for varying the secondary-circuit resistance to thus effect acceleration of the motor, in accordance with a familiar practice; a plurality of switches 63, 64 and 65 for respectively connecting the terminals of the primary winding P to the supply-circuit conductors 60, 61 and 62; a plurality of similar switches 66 and 67 for short-circuiting the secondary winding S and the liquid rheostat LR under conditions to be described; and an operating mechanism 59 for varying the liquid level in the tank 68.

The liquid rheostat is diagrammatically shown as comprising the bottom reservoir 3, a containing-tank 68, a liquid inlet 69 and three electrodes 70 that are connected to the terminals of the secondary winding S. A combined outlet and discharge valve 71 is provided for varying the liquid level in the tank. Normally, the valve 71 occupies the illustrated discharging position wherein the upper relatively small cylindrical portion 72 of the discharge valve is positioned within a bottom opening that corresponds to the previously-described openings 12 of Fig. 2, whereby the liquid is freely discharged around the valve 71 into the bottom reservoir 3.

By raising the valve 71 to a position wherein the lower cylindrical portion 73 slidingly fits the bottom discharge opening 12, the liquid height is raised to a plane, marked "Flush-Level," that is substantially level with the top of the valve 71, the liquid just immersing the electrode tips and being continuously discharged downwardly through the hollow valve into the bottom reservoir 3.

A rod 74 is shown as connected to the valve 71 for raising or lowering it and is provided with a suitably insulated contact member 75 which is adapted to bridge a plurality of stationary contact members 76 and 77, under liquid-level conditions to be described.

For the purpose of transmitting movement to the valve-rod 74, a suitable rope or cable 78 is shown as passing over a sheave 79 which is rigidly secured to a shaft 80.

The operating mechanism 59 is of a familiar electrically-controlled, pneumatically-actuated type and comprises a pinion 81 that is rigidly secured to one end of the shaft 80 and is adapted to mesh with a vertically-movable rack member 82, to the opposite ends of which a plurality of pistons 83 and 84 that are adapted to travel within suitable operating cylinders 85 and 86 are attached. A plurality of dissimilar valve members 87 and 88 are associated with the respective operating cylinders 85 and 86 to admit fluid pressure thereto through pipes or passages 89 and 90 from any suitable source of fluid pressure, such as a tank 91, under conditions to be described. An actuating coil marked " On " is provided for the valve 87, while the other valve 88 is adapted to be actuated to its opposite position through the agency of an actuating coil marked " Off."

The operation of the apparatus just described, without regard to the electrical circuits governed thereby, may be described as follows: " Under the illustrated normal conditions, fluid pressure is admitted to the cylinder 86 through the normally open valve 88, whereby the pistons are biased to one extreme position, since the other valve member 87 is normally closed to prevent the access of fluid pressure to the other cylinder 85. To effect upward movement of the pistons, the actuating coils " On " and " Off " are concurrently energized, whereby the initial fluid-pressure conditions are reversed, that is, fluid pressure is admitted to the cylinder 85 and is exhausted from the other cylinder 86, and an upward movement of the pistons and of the discharge valve 71 ensues. To arrest such movement at any desired point, it is merely necessary to deënergize the " off " coil, whereupon balanced-pressure conditions obtain in the two operating cylinders to effect a positive and reliable stoppage of the mechanism. To return the apparatus to the normal position, the actuating coils " On " and " Off " are concurrently deënergized, whereby the fluid-pressure conditions revert to the original state and the mechanism is thus gradually returned to the position shown.

The auxiliary governing system that is shown in Fig. 9, comprises the various actuating coils that are illustrated in Fig. 8 and, in addition, a master controller MC that is adapted to occupy a plurality of operative positions respectively marked " Lower," " Hold " and " Raise "; and a battery B, or other suitable source of energy, for energizing the various actuating coils through the master controller.

Assuming that it is desired to effect acceleration of the induction motor, the master controller MC may be moved to its initial position "Lower", whereby a circuit is established from the positive terminal of the battery B, through conductor 101, control fingers 102 and 103, which are bridged by contact segment 104 of the master controller, conductors 105 and 106, the parallel-related actuating coils of the switches 63, 64 and 65 and conductors 107 and 108 to the negative battery terminal.

The primary motor winding P is thus connected to the supply-circuit conductors 60, 61 and 62, but the motor is not started into operation until the secondary circuit is completed through the liquid rheostat LR by the actuation of the master controller to its next position "Hold", whereby a circuit is completed from the contact segment 104 through control finger 109, conductor 110 and the actuating coil "On" to the negative conductor 107 and is further moved to its final position "Raise", whereupon a circuit is established from the contact segment 104 through control finger 111 and conductor 112 and the actuating coil "Off" to the negative conductor 107.

Since both actuating coils are energized, upward movement of the pistons and of the discharge valve will occur to thereby raise the liquid level in the tank 68, in accordance with previously-described operating principles.

Whenever the master controller occupies its "off" position, the butterfly valve member 29 of the mechanism 5 assumes the illustrated position, wherein a portion of the incoming electrolyte passes into the cooling tower branch pipe 22. However, as soon as the controller is actuated to its position "Hold" a circuit is completed from the contact segment 104 through control finger 113, conductor 114, interlock 67-out of the short-circuiting switch 67 in its open position (see Fig. 8) and the actuating coil 37 of the valve-controlling mechanism 5. Thus, the butterfly valve member 29 is actuated to its upper position to close the entrance to the branch pipe 22, as shown in Fig. 5, and thereby cause the entire stream of electrolyte to flow into the rheostat tank during the active operation thereof in accelerating the motor.

The discharge valve 71 is thus upwardly actuated to a position marked "Maximum Level", wherein the electrodes 70 are almost entirely immersed, so that the effective resistance of the rheostat is relatively low. In this position, the contact member 75, that is actuated by the valve rod 74, bridges the stationary contact members 76 and 77, whereby an auxiliary circuit is completed from the conductor 105, through conductor 115, the contact members 75, 76 and 77 and the parallel-related actuating coils of the short-circuiting switches 66 and 67 to the negative conductor 107. In this way, the secondary winding of the motor and the rheostat are short-circuited to complete the motor acceleration.

Since the rheostat is, in reality, electrically inactive as soon as the short-circuiting switches are closed, it follows that the butterfly valve member 29 may be allowed to assume its partially open position without impairing the operation of the rheostat. Such a result is effected by reason of the exclusion from the circuit of the actuating coil 37 of the valve-controlling mechanism 5 of the interlock 67-out, whereby the piston 28 of the air cylinder 25 is permitted to return to its illustrated position and thus effect the desired partial opening of the valve member 29.

The above-described upward movement of the discharge valve 71 may be arrested at any time by merely actuating the master controller to its intermediate position "Hold" whereby the "off" actuating coil is deënergized to effect the above-mentioned balanced-pressure conditions in the operating mechanism 59. By returning the master controller to its positions "Lower" or "Off", the actuating coils "On" and "Off" are deënergized, and the discharge valves 71 are actuated to the illustrated position.

I have thus provided a liquid rheostat comprising an electrode-containing tank, a cooling tower, means for conducting liquid to both the tank and the tower, a valve member for varying the distribution of liquid, and a master controller for governing the usual circuits and, in addition, for effecting the energization of the actuating coil 37 of the valve-controlling mechanism 5 to prevent admission of liquid to the cooling tower whenever the rheostat is in active operation; that is, whenever the controller occupies its "hold" or "raise" position, except when the short-circuiting switches have been closed.

I do not wish to be restricted to the specific structural details, arrangement of parts, or circuit connections herein set forth, as various modifications thereof may be effected without departing from the spirit and scope of my invention. I desire, therefore, that only such limitations shall be imposed as are indicated in the appended claims.

I claim as my invention:

1. In a liquid-containing rheostat, the combination with an electrode-containing tank and a cooling tower, of means dependent upon predetermined rheostatic operation for varying the volume of liquid traversing said cooling tower.

2. In a liquid-containing rheostat, the combination with an electrode-containing tank and a cooling tower, of means for automatically increasing the volume of liquid traversing said cooling tower under inactive conditions of the rheostat.

3. In a liquid-containing rheostat, the combination with an electrode-containing tank and a cooling tower, of means for diverting a portion of liquid to said cooling tower under inactive conditions of the rheostat and for causing all the liquid to traverse said tank at other times.

4. In a liquid-containing rheostat, the combination with an electrode-containing tank and a cooling tower, of a liquid reservoir, and means for effecting communication between said tank and said tower when emptying the tank into said reservoir, whereby a rapid discharge from the tank is effected.

5. In a liquid-containing rheostat, the combination with an electrode-containing tank and a cooling tower, of means for conducting liquid to the tank and to the tower, a valve in said means for varying the distribution of liquid, and means for governing said valve in accordance with predetermined rheostatic electrical conditions.

6. In a liquid-containing rheostat, the combination with an electrode-containing tank and a cooling tower, of a liquid-admitting pipe communicating with said tank, a branch pipe communicating with said tower, a valve for controlling the entrance to said branch pipe, means for varying the liquid level in said tank, and means dependent upon the liquid level for varying the volume of liquid traversing said cooling tower.

7. In a liquid-containing rheostat, the combination with an electrode-containing tank and a cooling tower, of means for conducting liquid to the tank and to the tower, a valve in said means for varying the distribution of liquid, an actuating coil for said valve, means for varying the liquid level in said tank, and means dependent upon the liquid level for energizing said coil.

8. In a liquid-containing rheostat, the combination with an electrode-containing tank and a cooling tower, of a liquid-admitting pipe communicating with said tank, a branch pipe communicating with said tower, a valve for controlling the entrance to said branch pipe, means for varying the liquid level in said tank, actuating coils for said valve and for said means, and a switching device for effecting the energization of said coils under predetermined conditions.

9. In a liquid-containing rheostat, the combination with an electrode-containing tank and a cooling tower, of a liquid-admitting pipe communicating with said tank, a second pipe communicating with said tower, a valve for controlling the entrance to said second pipe, means for varying the liquid level in said tank, actuating coils for said valve and for said means, and a controller for selectively effecting the energization of the actuating coils for said means to vary the liquid level and for effecting the energization of said valve-actuating coil in certain controller positions except when a predetermined liquid level is reached.

10. In a liquid-containing rheostat, the combination with an electrode-containing tank and a cooling tower, of a liquid-admitting pipe communicating with said tank, a second pipe communicating with said tower, a valve for controlling the entrance to said second pipe, means for varying the liquid level in said tank, actuating coils for said valve and for said means, a controller for selectively effecting the energization of the actuating coils for said means to vary the liquid level and for effecting the energization of said valve-actuating coil under active operating conditions of the rheostat to close the entrance to said second pipe, a plurality of rheostat-short-circuiting switches, means for effecting the closure of said switches when the maximum liquid level is reached, and means dependent upon said closure for effecting the re-opening of the entrance to said second pipe.

11. In a liquid-containing rheostat, the combination with an electrode-containing tank and a cooling tower, of means for conducting liquid to the tank and to the tower, a valve in said means for varying the distribution of liquid, and a controller for effecting operation of said valve in predetermined controller positions.

12. In a liquid-containing rheostat, the combination with an electrode-containing tank and a cooling tower, of means for conducting liquid to the tank and to the tower, a valve in said means for varying the distribution of liquid, and a controller for preventing the diversion of liquid to the cooling tower whenever the rheostat is actively connected in circuit.

13. The combination with a liquid-containing tank and auxiliary liquid-employing apparatus, of means for automatically varying the volume of liquid traversing said auxiliary apparatus in accordance with predetermined conditions appertaining to the liquid in said tank.

14. In a liquid-containing rheostat, the combination with an electrode-containing tank and a cooling tower, of means controlled by the liquid for varying the volume of liquid flowing through the cooling tower.

In testimony whereof, I have hereunto subscribed my name this 29th day of November 1916.

ARTHUR J. HALL.